(12) United States Patent
Vedula

(10) Patent No.: US 8,024,734 B2
(45) Date of Patent: Sep. 20, 2011

(54) ENABLING A DESIGNER TO SPECIFY WORKFLOWS TO PROCESS VARIOUS RESULTS OF EXECUTION OF TRANSACTIONS

(75) Inventor: Venkata Naga Ravikiran Vedula, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1537 days.

(21) Appl. No.: 11/308,793

(22) Filed: May 5, 2006

(65) Prior Publication Data

US 2007/0226738 A1 Sep. 27, 2007

(30) Foreign Application Priority Data

Mar. 23, 2006 (IN) .............................. 528/CHE/2006

(51) Int. Cl.
*G06F 9/46* (2006.01)
*G06Q 10/00* (2006.01)
*G06Q 30/00* (2006.01)

(52) U.S. Cl. .... 718/101; 718/106; 705/7.27; 705/14.51; 705/26.8; 705/26.81

(58) Field of Classification Search ........................ None
See application file for complete search history.

(56) References Cited

U.S. PATENT DOCUMENTS

| | | | |
|---|---|---|---|
| 6,578,159 B1 * | 6/2003 | Kitagawa et al. | 714/15 |
| 7,398,291 B2 * | 7/2008 | Osias | 709/203 |
| 7,657,590 B2 * | 2/2010 | Reading et al. | 709/201 |

* cited by examiner

*Primary Examiner* — Emerson Puente
*Assistant Examiner* — Camquy Truong
(74) *Attorney, Agent, or Firm* — Narendra Reddy Thappeta

(57) ABSTRACT

Enabling a designer to specify workflows to process various results of execution of transactions. A user specifies the specific workflow to be executed on the corresponding result of a transaction. A transaction mapping filter then detects the occurrence of each result and initiates execution of the corresponding workflow. As the transaction mapping filter can be implemented decoupled from the application software/code, a user can flexibly change the links of workflows to results of transactions, as desired in the specific situation.

17 Claims, 6 Drawing Sheets

```
301: <WebTransaction name="PurchaseOnline">
302:   <Step>
303:     <URL>/AddItems</URL>
303:     <Params>
305:       <param1><name>itemid</name></param1>
306:     </Params>
307:   </Step>
308:   <Step>
309:     <URL>/BeginCheckout</URL>
310:     <Params>
311:       <param1><name>username</name></param1>
312:       <param2><name>groupid</name><value>id001</value></param2>
313:     </Params>
314:   </Step>
315:   <TransactionComplete>
316:     <URL>/DoneChecking</URL>
317:     <Params></Params>
318:   </TransactionComplete>
319:   <Workflow URL="/DoneChecking" result="success">
320:     <Name>ProcessPurchaseOrder</Name>
321:     <Id>PO001</Id>
322:     <Params>
323:       <param1><name>username</name><username></username></param1>
324:       <param2><name>itemid</name><username></username></param2>
325:     </Params>
326:   </Workflow>
327: </WebTransaction>
```

*FIG. 3*

| Transaction Instance ID | Transaction Type/Name | Completed Operation | Transaction Status |
|---|---|---|---|
| T001 | PurchaseOnline | | Pending |
| T002 | PurchaseOnline | | Pending |

*FIG. 4A*

410 → T001 row
420 → T002 row

| Transaction Instance ID | Transaction Type/Name | Completed Operation | Transaction Status |
|---|---|---|---|
| T001 | PurchaseOnline | /AddItems | Pending |
| T002 | PurchaseOnline | | Failure |

*FIG. 4B*

430 → T001 row
440 → T002 row

| Transaction Instance ID | Transaction Type/Name | Completed Operation | Transaction Status |
|---|---|---|---|
| T001 | PurchaseOnline | /DoneChecking | Success |
| T002 | PurchaseOnline | | Failure |

*FIG. 4C*

450 → T001 row

US 8,024,734 B2

ENABLING A DESIGNER TO SPECIFY WORKFLOWS TO PROCESS VARIOUS RESULTS OF EXECUTION OF TRANSACTIONS

RELATED APPLICATIONS

The present application is related to and claims priority from the co-pending India Patent Application entitled, "Enabling a Designer to Specify Workflows to Process Various Results of Execution of Transactions", Serial Number: 528/CHE/2006, Filed: Mar. 23, 2006, naming the same inventors as in the subject patent application.

BACKGROUND OF THE INVENTION

1. Field of the Invention

The present invention relates to transaction processing systems, and more specifically to a method and apparatus enabling a designer to specify workflows to process various results of execution of transactions.

2. Related Art

A transaction is a group of operations that are performed by applications to provide a desired utility in response to request(s) received from a user. An example of a transaction is the purchase of products online containing operations such as selection of products of interest, addition of the products to a purchase list, generation of a bill for the products in the purchase list and payment of the billed amount as the user provides the appropriate inputs/data.

In a common scenario, the operations are executed sequentially and various workflows are executed in response to the result of execution of the operations. A workflow generally represents a peripheral task that needs to be performed to complement the result of processing a transaction (or the operations forming the transaction). While the transaction processing is implemented as central logic in an application program, the peripheral tasks are decoupled from the application program to form the workflows.

Workflows often involve tasks such as the movement of documents or shipping of products. For the above noted example, it may be necessary that the product and/or a physical copy of the bill have to be sent to the purchaser of the product. This may be executed as a separate workflow necessitating the initiation of the corresponding workflow when a purchase transaction is completed.

Designers writing (software instructions for) business applications often require specifying (linking) of workflows based on the results of transactions. According to one prior approach, the business applications processing the operations (belonging to a transaction) expressly specify the workflow to be initiated in response to a corresponding result of the transaction.

One disadvantage with such an approach is that addition of new links between workflows and transactions, as well as modification of existing links necessitates changing the code of the business application. Such an approach may not be feasible for business applications (for example, web applications) that need to be running continuously.

What is therefore needed is an approach, which enables a designer to specify workflows to handle various results of execution of transactions while addressing one or more problems/requirements described above.

BRIEF DESCRIPTION OF THE DRAWINGS

The present invention will be described with reference to the accompanying drawings briefly described below.

FIG. 3 depicts the contents of a XML document specifying a set of transaction mappings specifying workflows to be executed depending on the results of execution of transactions, according to an aspect of the present invention.

FIGS. 4A, 4B and 4C depict the contents of a table of a memory representing the status as various requests for operations and corresponding responses are received, in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

According to an aspect of the present invention, a designer may specify workflows to be executed based on the various results of execution of transactions. A transaction mapping filter detects the requests for operations sent to a (business) application Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1:
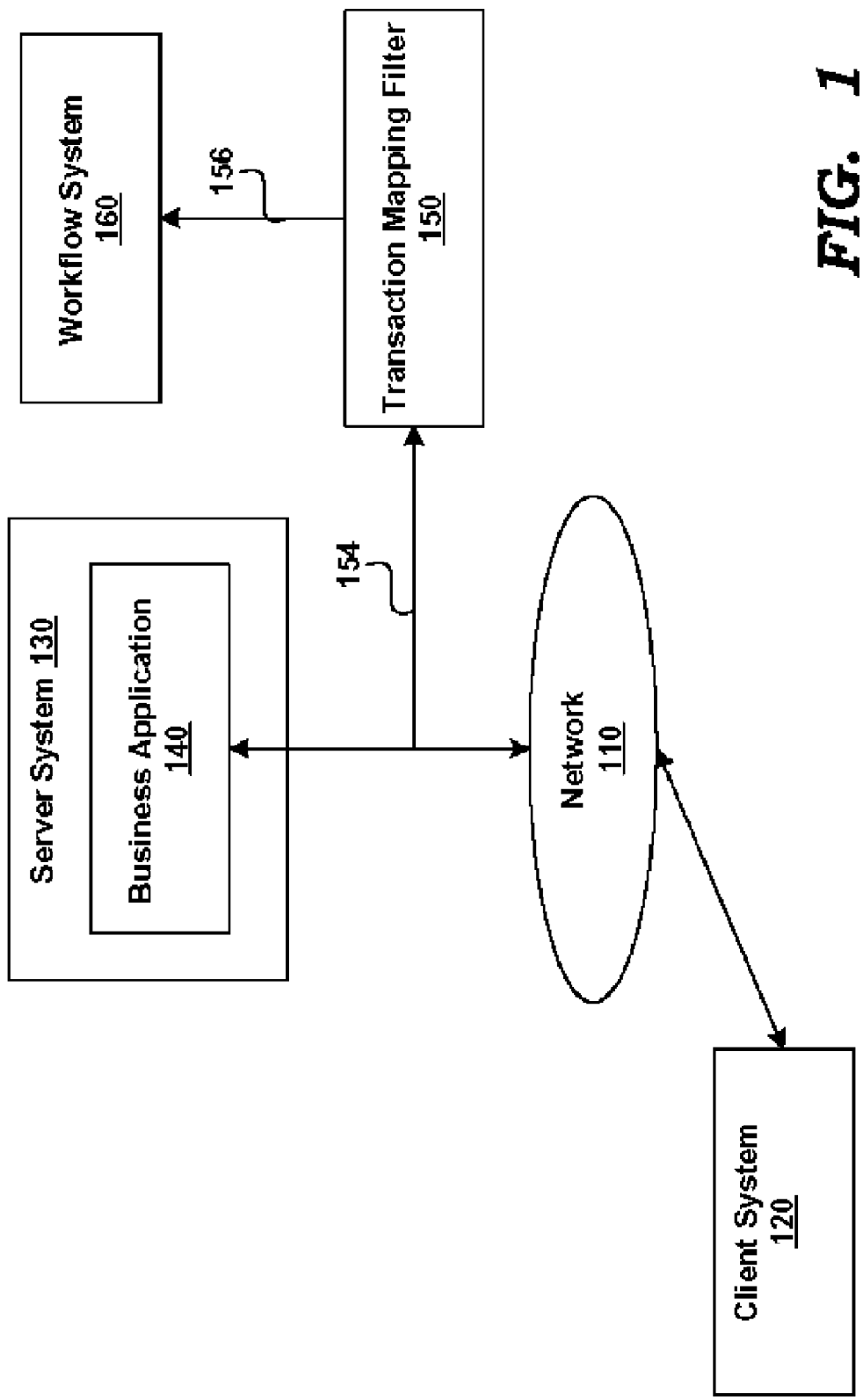
FIG. 1 is a block diagram illustrating an example environment in which various aspects of the present invention can be implemented.

FIG. 1 is a block diagram illustrating an example environment in which various aspects of the present invention can be implemented. The environment is shown containing network 110, client system 120, server system 130 containing business application 140, transaction mapping filter 150, and workflow system 160. Each system is described in further detail below.

Network 110 provides necessary communication between client system 120 and server system 130 using protocols such as TCP/IP well known in the relevant arts. Client system 120 requests operations (belonging to a transaction) to be performed on server system 130 (through network 110) using either custom applications or potentially user interfaces provided on a web browser.

Server System 130 receives requests for operations (belonging to a transaction) from client system 120, identifies the receiver application (for example, business application 140) to process the operation and forwards the request to the application. In an embodiment, server system 130 is implemented as a web server (for example, Oracle Application Server iAS available from Oracle International Corporation) accepting request URLs from client systems and forwarding the requests to applications running in the web server. Business application 140 performs the requested operations, and sends the corresponding results as responses of the operations to client system 110.

Workflow system 160 supports interfaces by which various workflows can at least be initiated (if not completely executed). For example, one work flow may ship ordered items, another work flow may order (to replenish inventory), yet another work flow may send a cancellation notice, etc. In an embodiment, workflow system 160 is implemented using Oracle BPEL Process Manager available from Oracle International Corporation.

It may be appreciated that a designer needs to specify the specific workflows to be executed depending on the result of execution of a transaction. For example, a designer would like to specify different workflows for a transaction involving an online purchase of an item. On successful purchase, a workflow to ship the purchased item is initiated; while on failure a workflow to send a cancellation notice is initiated.

Transaction mapping filter 150 implemented according to various aspects of the present invention enables a designer to flexibly specify the workflows that need to be executed depending on the result of execution of transactions. Transaction mapping filter 150 may be implemented internal to server system 130 or in a separate system which monitors (or otherwise receives and examines) the operation requests to server system 130 and responses thereto. The detail of an example embodiment of transaction mapping filter 150 is described below in further detail.

3. Specifying Workflows to Process Results of Transactions

Figure 2:
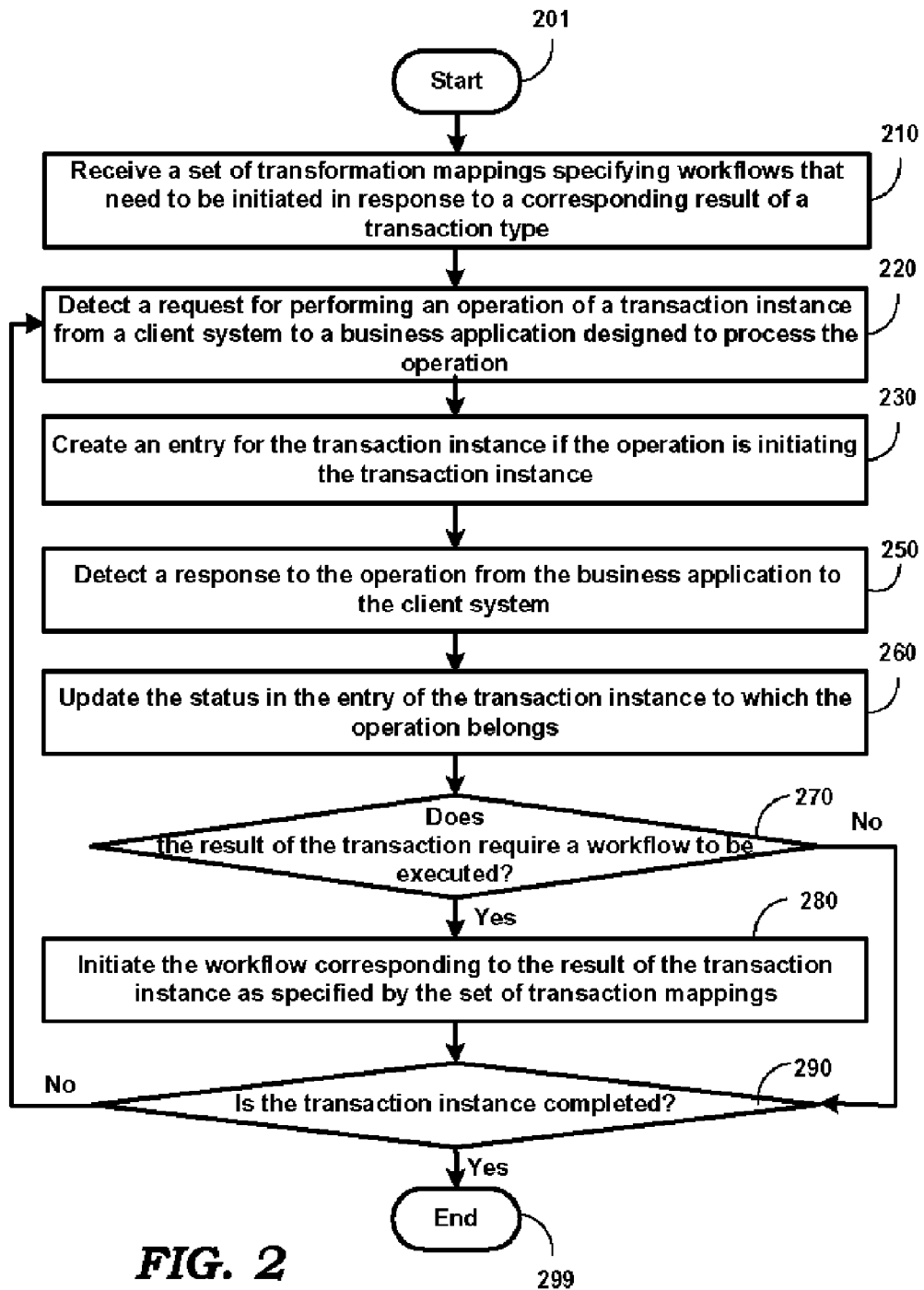
FIG. 2 is a flowchart illustrating the manner in which a designer may specify workflows to be executed depending on the results of execution of transactions, according to an aspect of the present invention.

FIG. 2 is a flowchart illustrating the manner in which a designer may specify workflows to be executed depending on the results of execution of transactions, according to an aspect of the present invention. The flowchart is described with respect to FIG. 1 merely for illustration. The features can however be implemented in other environments as well, as will be apparent to one skilled in the relevant arts by reading the disclosure provided herein. The flowchart begins in step 201, wherein control immediately passes to step 210.

In step 210, transaction mapping filter 150 receives a set of transformation mappings specifying workflows that need to be initiated in response to a corresponding result of an operation of a transaction type. In an embodiment described below, the set of transaction mappings is received as an XML document. However, the information can be received according to any convention.

In step 220, transaction mapping filter 150 detects a request for performing an operation of a transaction instance (of a transaction type) from a client system to a business application designed to process the operation. The detection can be based on one of several mechanisms. In an embodiment, transaction mapping filter 150 monitors the requests to and responses (described below) from business application 140, and detects the request for performing an operation passively without interfering with the flow of requests and responses. Alternatively, transaction mapping filter 150 can operate in receive/examine/and forward mode.

In step 230, transaction mapping filter 150 creates an entry for the transaction instance if the operation is initiating the transaction instance. In an embodiment described below, the entries are created in a table in a random access memory and each transaction instance is associated with a unique identifier uniquely identifying the transaction instance. In an embodiment, a session identifier contained in each of the received requests/responses is used as the unique identifier (since only a single transaction is generally active in one session in the described embodiment).

In step 250, transaction mapping filter 150 detects a response to the operation from the business application to the client system. The response is correlated with the request based on the unique identifier associated with the transaction instance.

In step 260, transaction mapping filter 150 updates the status in the entry of the transaction instance to which the operation belongs. The status may be modified to reflect that the operation is complete.

In step 270, transaction mapping filter 150 determines whether the result of the operation requires a workflow to be executed based on the set of transaction mappings of step 210. If a workflow needs to be executed, control passes to step 280, or else to step 290. In step 280, transaction mapping filter 150 initiates the workflow corresponding to the result of the transaction instance as specified by the set of transaction mappings. The workflow may be initiated using a pre-specified interface provided by the specific operating environment.

In step 290, transaction mapping filter 150 determines whether the transaction instance is completed. In an embodiment described below, business application 140 generates a packet (and sends to client system 110), which expressly indicates the completion of the transaction, and transaction mapping filter 150 may determine the completion of the transaction instance on detecting such a packet. Control passes to step 299 if transaction instance is completed and to step 220 otherwise. The flowchart ends in step 299.

It may be appreciated that the requests for operations and responses provided by the business application are detected, and workflows are initiated based on the result of the operations of the transaction. The flowchart above is illustrated below with an example.

4. Illustration

FIGS. 3, 4A, 4B and 4C together are used to illustrate the manner in which the approach(es) of FIG. 2 can be used to specify workflows to be executed depending on the results of execution of operations of transactions. Each Figure is described below in further detail FIG. 3 depicts the contents of a XML document specifying a set of transaction mappings (of step 210 described above) specifying workflows to be executed depending on the results of execution of transactions (or operations thereof, as described above), according to an aspect of the present invention. The contents correspond to an example scenario in which business application 140 broadly provides the functionality of purchasing a product online. In particular, operations such as adding items to a purchase list and payment for the items in the purchase list during check out together are specified, and workflows such as processing the purchase order are specified based on the result of the transaction.

Lines 301-327 specify a transaction mapping with name/type "PurchaseOnline" (as specified in line 301). The transaction mapping contains two operations specified in lines 302-307 and lines 308-314 respectively. The two operations specified are accessed by client system 110 using URLs "/AddItems" of line 303 and "/BeginCheckout" of line 309 respectively. In other words, the URLs would cause execution of the software instructions in business application 140 implementing the corresponding operations.

The transaction mapping also specifies in lines 315-318 a packet (containing the URL "/DoneChecking" of line 316) that indicates the completion of the transaction. Thus, business application 140 may need to be designed to generate a packet containing such a URL and send the packet to the client upon completion of the transaction.

Lines 319-326 specifies a workflow with name "ProcessPurchaseOrder" (of line 320) is linked to the transaction containing the above two operations. Line 319 specifies that the workflow needs to be initiated when a packet/response containing "/DoneChecking" is detected. Similar convention can be employed to specify other workflows to be executed in response to detecting any desired results (or combination) of other operations (specified by URLs).

When processing lines such as 311 specifying parameters (i.e., "username"), transaction mapping filter 150 may be designed to stores the value of the parameters in a memory when the corresponding parameter (along with value) is found in a request or a response. The value thus stored may be made available while initiating the workflows if the corresponding transaction mapping so specifies. For example, value of the parameter username would be made available to the workflow ("ProcessPurchaseOrder"), as specified in line 323.

On the other hand, when a value is specified in a transaction mapping for a parameter, the operation is monitored only if the specified value of the parameters matches the value in the request. Accordingly, line 312 causes transaction mapping filter 150 to monitor operation "/BeginCheckout" only if the parameter ("groupid") matches the value "id001".

Thus, the set of transaction mappings may be specified using conventions such as that described above. As noted above, with respect to step 230, a table may be maintained indicating the status of various operations of transaction instances. The status information may be maintained as described below with respect to FIGS. 4A, 4B and 4C.

FIGS. 4A, 4B and 4C depict the contents of a table of a memory representing the status as various requests for operations and corresponding responses are received, in one embodiment. Each Figure is described below in further detail.

FIG. 4A corresponds to a scenario after two initial requests for operations corresponding to two transaction instances (of type PurchaseOnline and with session identifiers T001 and T002 respectively) are received. Rows 410 and 420 reflect the corresponding information. In addition, the column "Completed Operation" is shown empty reflecting that the pending operation is the initiating/first operation. Both the rows are shown with Pending in the column entitled Transaction Status.

FIG. 4B corresponds to a scenario after the responses corresponding to the two transaction instances of FIG. 4A are received. Row 430 indicates that the operation "/AddItems" has completed and the status of the transaction instance continues to be pending. Row 440 indicates that the previously received response indicates that the processing of the transaction instance has failed. The failure condition may be concluded if the corresponding output packet is not received in a pre-specified duration (after detecting the request) or if the output expressly indicates a failure according to any pre-specified convention. In general, the output of processing of operations can indicate any desired status of the transaction and a corresponding workflow can be executed as a result.

FIG. 4C corresponds to a scenario after receiving a packet containing an indication of the completion of the transaction instance with identifier T001 by virtue of receiving URL "/DoneChecking" as a response. Accordingly, the status column of entry 450 corresponding to transaction instance T001 is shown updated to "Success" representing the successful completion of the transaction instance and the "Completed Operation" column is shown containing "/DoneChecking".

Thus, transaction mapping filter 150 maintains the status of transaction using approaches such as the one described above, and uses the information to initiate execution of workflows as described above. The features thus described can be implemented in various embodiments. The description is continued with respect to example embodiments.

5. Transaction Mapping Filter

Figure 5:
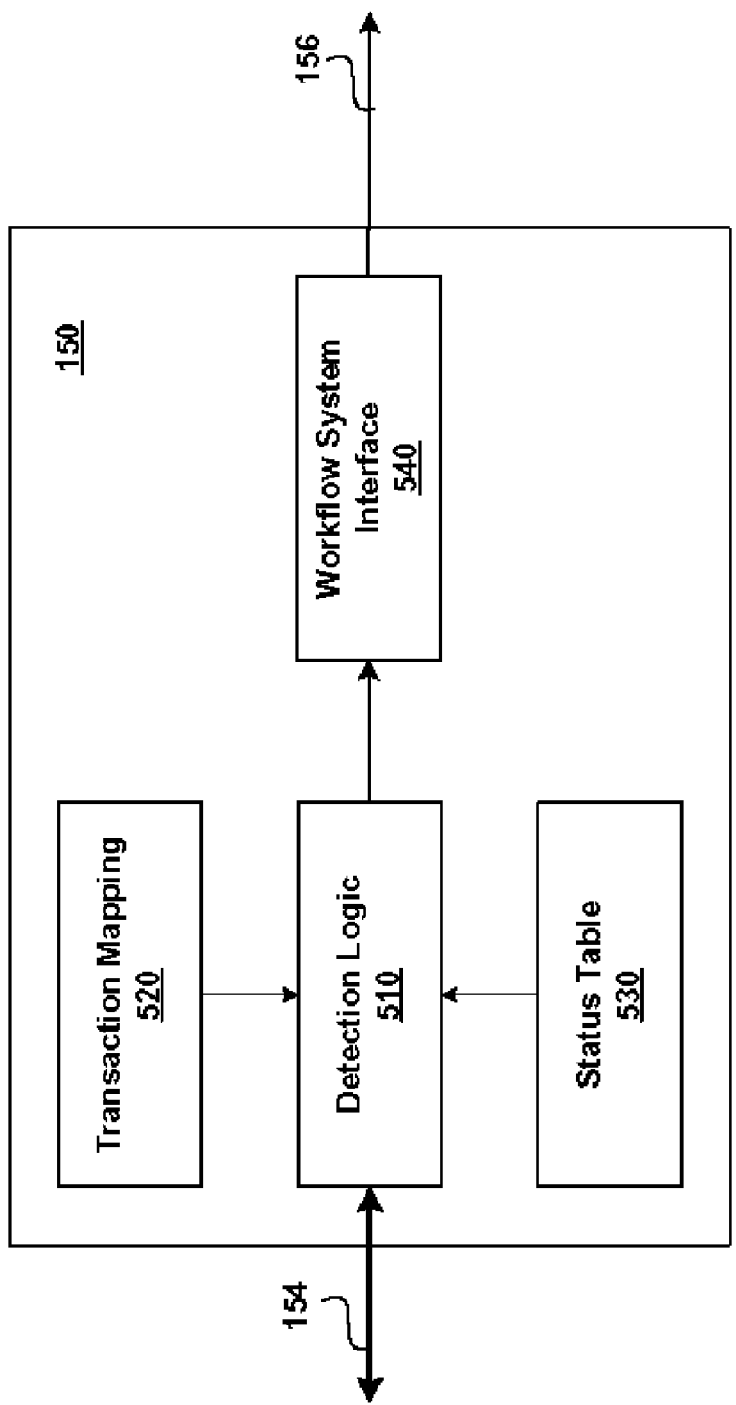
FIG. 5 is a block diagram illustrating the details of transaction mapping filter 150 in one embodiment.

FIG. 5 is a block diagram illustrating the details of transaction mapping filter 150 in one embodiment. The block diagram is shown containing detection logic 510, transaction mapping data 520, status table 530 and workflow system interface 540. Each block is described below in further detail below.

Transaction mapping data 520 represents a set of transformation mappings specifying the workflows to be initiated based on the results of transactions. Detection logic 510 examines the requests and responses between client system 110 and business application 140 and identifies the workflows to be executed based on transaction mapping data 520.

Detection logic 510 maintains the status of the transactions in status table 530 (as described above with respect to FIGS. 4A-4C) and the status information can be used in identifying the workflows to be executed. Detection logic 510 then indicates to workflow interface 540 the specific workflow to be executed, and also passes any parameter values as specified in transaction mapping data 520. The parameter values, transaction mapping data 520 and status table 530 may be stored in a random access memory and accessed during operation.

Workflow system interface 540 interfaces with workflow system 160 to initiate the desired workflow (received from detection logic 510). In general, workflow system interface 540 needs to be implemented consistent with the interface exposed by workflow system 160 and thus depends on the implementation of workflow system 160. The implementation of workflow system interface 540 will be apparent to one skilled in the relevant arts.

It should be further appreciated that the features described above can be implemented in various embodiments as a desired combination of one or more of hardware, software and firmware. The description is continued with respect to an embodiment in which various features are operative when software instructions are executed.

6. Digital Processing System

Figure 6:
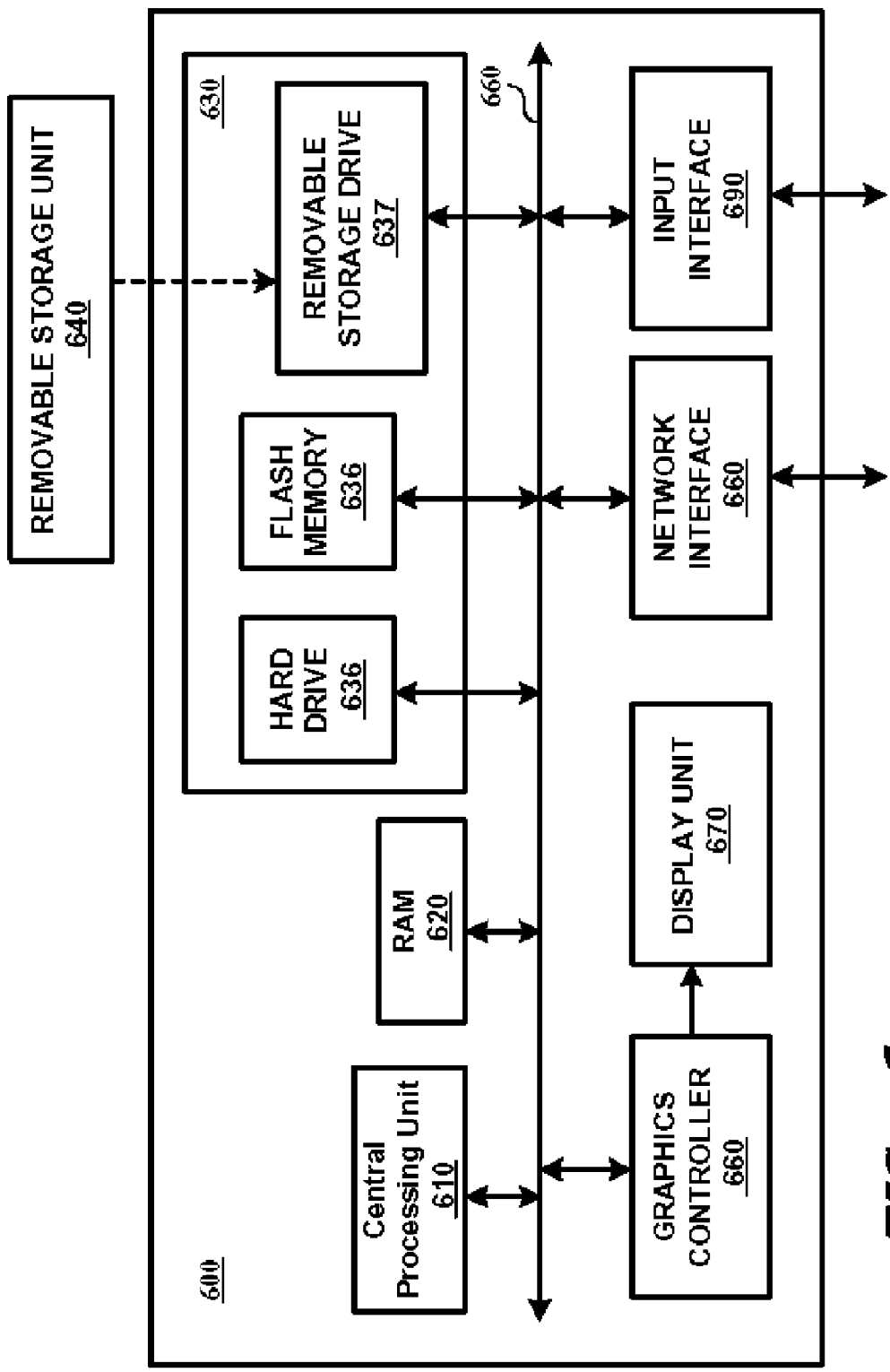
FIG. 6 is a block diagram illustrating the details of digital processing system 600 in which various aspects of the present invention are operative by execution of appropriate software instructions.

FIG. 6 is a block diagram illustrating the details of digital processing system 600 in which various aspects of the present invention are operative by execution of appropriate software instructions. System 600 may contain one or more processors such as central processing unit (CPU) 610, random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general purpose processing unit. RAM 620 may receive instructions from secondary memory 630 using communication path 650.

Graphics controller 660 generates display signals (e.g., in RGB format) to display unit 670 based on data/instructions received from CPU 610. Display unit 670 contains a display screen to display the images defined by the display signals. Input interface 690 may correspond to a key-board and/or mouse. The combination of input interface 690 and display unit 670 may be used by a user to conveniently specify the transaction mappings described above. Network interface 680 provides connectivity to a network (e.g., using Internet Protocol), and may be used to communicate with the other systems of FIG. 1.

Secondary memory 630 may contain hard drive 635, flash memory 636 and removable storage drive 637. Secondary memory 630 may store the data and software instructions, which enable system 600 to provide several features in accordance with the present invention. Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable storage medium having stored therein computer software and/or data.

In this document, the term "computer program product" is used to generally refer to removable storage unit 640 or hard disk installed in hard drive 635. These computer program products are means for providing software to system 600. CPU 610 may retrieve the software instructions, and execute the instructions to provide various features of the present invention described above.

7. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents. Also, the various aspects, features, components and/or embodiments of the present invention described above may be embodied singly or in any combination in a data storage system such as a database system.

What is claimed is:

1. A method of executing a set of workflows associated with an application, wherein each of said set of workflows is to be executed by a workflow system upon occurrence of a corresponding result of execution of a transaction by said application present on a server system implemented external to said workflow system, wherein said transaction contains a set of operations, said method comprising:

receiving a set of transaction mappings indicating the specific ones of a plurality of workflows to be executed when a respective result is generated by execution of corresponding operation in the application in said server system, said set of transaction mappings being provided external to said application;

detecting that a first operation is sent to said application for processing;

determining a first result of execution of said transaction based on the processing of said first operation by said application;

examining said set of transaction mappings to find a set of workflows corresponding to said combination of said result and said first operation, wherein said set of workflows equals a first set of workflows if said result equals a first result and a different set of workflows if said result equals a second result;

initiating said set of workflows for execution, wherein said determining comprises examining a packet generated by said application while processing said first operation and whether said result equals said first result or said second result, is determined based on a content of said packet, wherein said workflows represent peripheral tasks decoupled from said application and are for complementing the result of processing said transaction, wherein said first operation is a part of set of operations received by said server system from a client system, wherein processing of said set of operations together cause said server system to process a transaction.

2. The method of claim 1, wherein said first result comprises a failure upon not receiving an output of processing of said first operation in a pre-specified duration and wherein said first set of workflows is executed upon said failure result.

3. The method of claim 1, wherein said content indicates successful completion of execution of said transaction and wherein said first set of workflows is executed upon successful completion of execution of said transaction.

4. The method of claim 1, wherein said content comprises a pre-specified URL.

5. The method of claim 1, further comprising maintaining a data structure indicating that said first operation is sent to said application for processing after said detecting.

6. The method of claim 1, wherein said receiving, said detecting, said finding and said initiating are implemented in software instructions external to said application.

7. A non-transitory computer readable medium storing one or more sequences of instructions for causing a transaction mapping filter to cause execution of a set of workflows on a workflow system, said set of workflows being associated with an application, said application being present on a server system implemented external to said workflow system, wherein each of said set of workflows is to be executed upon occurrence of a corresponding result of execution of a transaction by said application, wherein said transaction contains a set of operations, wherein execution of said one or more sequences of instructions by one or more processors contained in said system causes said one or more processors to perform the actions of:

receiving a set of transaction mappings indicating the specific ones of a plurality of workflows to be executed when a respective result is generated by execution of corresponding operation in the application in said server system, said set of transaction mappings being provided external to said application detecting that a first operation is sent to said application for processing;

determining a first result of execution of said transaction based on the processing of said first operation by said application;

examining said mappings to find a set of workflows corresponding to said combination of said result and said first operation, wherein said set of workflows equals a first set of workflows if said result equals a first result and a different set of workflows if said result equals a second result;

initiating said set of workflows for execution on said workflow system, wherein said determining comprises examining a packet generated by said application while processing said first operation and whether said result equals said first result or said second result, is determined based on a content of said packet, wherein said workflows represent peripheral tasks decoupled from said application and are for complementing the result of processing said transaction, wherein said first operation is a part of said set of operations received by said server system from a client system, wherein processing of said set of operations together cause said server system to process said transaction.

8. The non-transitory computer readable medium of claim 7, wherein said first result comprises a failure upon not receiving an output of processing of said first operation in a pre-specified duration and wherein said first set of workflows is executed upon said failure result.

9. The non-transitory computer readable medium of claim 8, wherein said content indicates successful completion of execution of said transaction and wherein said first set of workflows is executed upon successful completion of execution of said transaction.

10. The non-transitory computer readable medium of claim 9, wherein said content comprises a pre-specified URL.

11. The non-transitory computer readable medium of claim 7, further comprising maintaining a data structure indicating that said first operation is sent to said application for processing after said detecting.

12. The non-transitory computer readable medium of claim 7, wherein said receiving, said detecting, said finding and said initiating are implemented in software instructions external to said application.

13. A set of systems to process transactions, said set of systems comprising:

a server system for executing an application designed to generate a respective result by execution of a set of operations together constituting a transaction;

a transaction mapping filter having a mapping data indicating the specific ones of a plurality of workflows to be executed when a respective result is generated by execution of corresponding operation in said application in said server system, said mapping data and said transaction filter being provided external to said application, said transaction mapping filter further operable to:

detecting that a first operation of said set of transactions is sent to said application for processing;

determining that said application has generated a result by executing said first operation;

examining said mapping to find a set of workflows corresponding to said combination of said result and said first operation, wherein said set of workflows equals a first set of workflows if said result equals a first result and a different set of workflows if said result equals a second result; and initiating said set of workflows for execution in a workflow system implemented external to said server system, wherein said determining comprises examining a packet generated by said application while processing said first operation and whether said result equals said first result or said second result, is determined based on a content of said packet, wherein said set of operations are received from a client system to cause said server system to process said transaction, and wherein said workflows represent peripheral tasks decoupled from said application and are for complementing the result of processing said transaction, wherein said server system comprises a processor and a memory, wherein said processor is designed to retrieve instructions from said memory and execute the retrieved instructions.

14. The set of systems of claim 13, wherein said first result comprises a failure upon not receiving an output of processing of said first operation in a pre-specified duration and wherein said first set of workflows are executed upon said failure result.

15. The set of systems of claim 14, wherein said content indicates successful completion of execution of said transaction and wherein said second set of workflows are executed upon successful completion of execution of said transaction.

16. The set of systems of claim 15, wherein said transaction mapping filter is further operable to maintain a data structure indicating that said first operation is sent to said application for processing after said detecting.

17. The set of systems of claim 15, wherein said transaction mapping filter is implemented external to said server system.

* * * * *

UNITED STATES PATENT AND TRADEMARK OFFICE
CERTIFICATE OF CORRECTION

| | | |
|---|---|---|
| PATENT NO. | : 8,024,734 B2 | Page 1 of 1 |
| APPLICATION NO. | : 11/308793 | |
| DATED | : September 20, 2011 | |
| INVENTOR(S) | : Vedula | |

It is certified that error appears in the above-identified patent and that said Letters Patent is hereby corrected as shown below:

On Sheet 3 of 6, in figure 3, line 4, delete "303:" and insert -- 304: --, therefor.

In column 2, line 37, delete "application" and insert -- application. --, therefor.

In column 4, line 48, delete "detail" and insert -- detail. --, therefor.

Signed and Sealed this
Twentieth Day of December, 2011

David J. Kappos
*Director of the United States Patent and Trademark Office*